Patented Apr. 7, 1931

1,799,954

UNITED STATES PATENT OFFICE

OSCAR A. CHERRY, OF CHICAGO, ILLINOIS, ASSIGNOR TO ECONOMY FUSE AND MANUFACTURING COMPANY, OF CHICAGO, ILLINOIS, A CORPORATION OF NEW YORK

UREA CONDENSATION PRODUCT

No Drawing.    Application filed April 20, 1929. Serial No. 356,879.

This invention relates to a process of making condensation products from formaldehyde or its polymers and urea, thiourea or its derivatives and the products made thereby.

This invention relates particularly to a process of the above described character for making transparent or glass-like products and to the products so produced.

Products of this character are obtained by reacting urea, thiourea or its derivatives with formaldehyde or its polymers under various prescribed conditions, such as for instance, particular ratios between the proportions of formaldehyde and urea employed and also the prevailing condition of the solution at the time of reaction as to whether the solution is alkaline, neutral or acid in character.

The various conditions of reaction have been found to produce results but those processes which have proven most desirable result in the production of an initial condensation product which is found to be a soluble substance forming a solution which on standing in the atmosphere or being heat treated, is capable of being gelatinized to form a viscous intermediate product which intermediate product is capable of being finally hardened into an insoluble and infusible transparent substance.

When comparatively large masses of the gelatinous intermediate product are to be converted into the final hard insoluble and infusible substance, this is usually accomplished by means of heat treatment in which the product is heated at a temperature below the boiling point of water and upon being subjected to such heat treatment, the substance increases in hardness and strength as the heating progresses.

Considerable difficulty, however, has been encountered in this hardening process, in the production of transparent substances, as it has been found that upon continuing the heat treatment, as above outlined, to the point where the material has attained its maximum hardness, that the objects so formed and treated are quite likely to crack in one or more places. The exact cause of this objectionable cracking has not been definitely ascertained but it has been believed by some, to be due to the presence of excess formaldehyde which is necessarily present in the formation of transparent articles of the type herein referred to. It has been ascertained, however, that the difficulty can not be avoided by providing excess urea to eliminate the free formaldehyde as the addition of larger quantities of urea results in the formation of products which are not clear and transparent. Attempts have been made however, acting upon the belief that the excess formaldehyde causes the undesirable cracking, to add certain substances to combine with the free formaldehyde, but then, as far as it is known, all processes which have been heretofore devised which involve introduction of some substance to combine with the free formaldehyde have not been successful in eliminating the objectionable cracking referred to, although they have reduced to some extent, the presence of bubbles which are apt to form in the products, during the hardening process.

Furthermore, processes which involve the introduction of substances to combine with the free formaldehyde require a procedure in commercial practice involving a high degree of care and in addition are accompanied by considerable danger of obtaining opaque objects rather than the transparent objects usually desired.

It is accordingly an object of this invention to overcome these objections and to provide a process by which glass-like transparent articles can be obtained, capable of being hardened to the final insoluble, infusible form without liability of the objectionable cracking.

For the purpose of illustrating the present invention, one process which has been found to serve well in the production of transparent articles will be given by way of illustration. Accordingly the present invention is based upon the discovery that the incorporation of a small quantity of sucrose or cane sugar in the urea condensation product at any stage of its production prior to that of gelatinization, eliminates the tendency of the molded articles to crack during the hardening operation.

By way of illustration, the preferred method of practicing this process and of obtaining novel and improved products may be given as follows:

To three hundred and fifty parts by weight of commercial forty per cent formaldehyde is added ten parts by weight of zinc dust and the whole is heated to boiling under a reflux condenser and the source of heat is withdrawn. Upon cessation of ebullition one hundred parts by weight of urea are added. If desired the urea may be added in small portions but this is unnecessary. The solution is heated to boiling under the reflux condenser. If a large quantity of materials is being treated cooling may be employed to minimize the vigor of the reaction. The reaction will have progressed sufficiently in a few minutes when the liquid may be filtered to remove the excess metal. Preferably decolorizing carbon is added before filtration to remove the objectionable color, usually present in commercial formaldehyde.

After filtration the solution is distilled at atmospheric or reduced pressure until the major portion of the water has been removed. At this point 20 parts by weight of sucrose are added and the distillation is then continued until a product of suitable viscosity for casting or molding is obtained. The product is then heated in the mold or molds at preferably from fifty degrees to sixty degrees C. Somewhat higher temperatures may be employed but if the molded object is quite large, it is not desirable to exceed these temperatures in the early stages of the heating. Unlike urea products made without the addition of sucrose, the heating may be continued to the point where the material has attained its maximum hardness without danger of cracks or fissures forming.

The final product is a clear, glass-like product. Like urea condensation products in general, it is affected by boiling water, is infusible and is mechanically strong.

It is to be understood, of course, that the sucrose may be added at any stage of the process previous to gelatinization but it is preferred to add the sucrose at the stage indicated in the example. It is obvious of course, that other processes of preparing the initial reaction product may be used, but on account of its manifold advantages the above process is preferred.

It is to be understood also, that additions of materials other than sucrose may be made simultaneously for known purposes. For example, phenol and sucrose may be added together.

I claim:

1. The process of gelatinizing the resultant product of urea and formaldehyde which consists in heating said resultant product in the presence of sucrose.

2. The process which consists in reacting urea and formaldehyde and gelatinizing the resultant product in the presence of sucrose.

3. The process which consists in reacting urea and formaldehyde, introducing sucrose and then heating the product to produce gelatinization thereof.

4. The product formed by gelatinizing the resultant product of urea and formaldehyde in the presence of sucrose.

Signed at Chicago, Illinois, this 16th day of April, 1929.

OSCAR A. CHERRY.